(12) United States Patent
Saito

(10) Patent No.: US 7,495,844 B2
(45) Date of Patent: Feb. 24, 2009

(54) WIDE-ANGLE OPTICAL SYSTEM FOR SOLID-STATE IMAGE PICKUP DEVICE

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 228 days.

(21) Appl. No.: 11/641,417

(22) Filed: Dec. 19, 2006

(65) Prior Publication Data
US 2007/0146899 A1    Jun. 28, 2007

(30) Foreign Application Priority Data
Dec. 26, 2005  (JP) .............................. 2005-372266

(51) Int. Cl.
G02B 3/02      (2006.01)
G02B 13/18     (2006.01)
G11B 7/135     (2006.01)
(52) U.S. Cl. .................................. 359/719; 369/112.23
(58) Field of Classification Search ................. 359/718, 359/719; 369/112.23
See application file for complete search history.

(56) References Cited

U.S. PATENT DOCUMENTS 6,344,935 B1 *  2/2002  Maruyama .................. 359/722
6,888,686 B2 *  5/2005  Do .............................. 359/717

* cited by examiner

*Primary Examiner*—Scott J Sugaman
(74) *Attorney, Agent, or Firm*—William L. Androlia; H. Henry Koda

(57) ABSTRACT

It is to provide a wide-angle optical system for a solid image pickup device that favorably corrects distortion. The imaging lens is a biconvex lens, the object side face is formed into an aspheric shape in which the negative refracting power becomes stronger the farther the imaging lens is from an optical axis in the radial direction, and a condition expressed by the following expression (1) is to be satisfied;

$$0.8 > |r_1/r_2| \geq 0.5 \tag{1}$$

where,
$r_1$: center radius curvature of the object side face of the imaging lens
$r_2$: center radius curvature of the image surface side face of the imaging lens.

4 Claims, 7 Drawing Sheets

WIDE-ANGLE OPTICAL SYSTEM FOR SOLID-STATE IMAGE PICKUP DEVICE

BACKGROUND OF THE INVENTION

1. Field of the Invention

The present invention relates to a wide-angle optical system for a solid image pickup device. In particular, the present invention relates to a wide-angle optical system for a solid image pickup device suitable for use in an image-taking device that uses a solid image pickup device mounted on a portable phone, a PC camera, and the like.

2. Description of the Related Art

In recent years, with the development of mass-media, there has been an increasing demand for cameras that utilize a solid image pickup device, such as a CCD, CMOS, or the like, which are mounted on a portable computer, a television phone, or a portable phone, for example.

It is demanded that a camera such as this is small and light because the camera is required to be mounted on a limited installation space.

Therefore, it is also necessary for the optical system used for such cameras to be small and light, as is the camera.

When only aiming for higher performance, an optical system using two lenses or three lenses is may be used as the optical system used in such cameras. However, in order to actualize size reduction and cost reduction, a single lens optical system is often used. An optical system including imaging lenses such as a biconvex lens, a meniscus lens, or the like is used as the single lens optical system (for example, refer to Patent Literatures 1-6).

[Patent Literature 1] Japanese Patent Unexamined Publication Heisei 6-88939

[Patent Literature 2] Japanese Patent Unexamined Publication Heisei 10-282410

[Patent Literature 3] Japanese Patent Unexamined Publication Heisei 11-264930

[Patent Literature 4] Japanese Patent Unexamined Publication Showa 61-116314

[Patent Literature 5] Japanese Patent Unexamined Publication Heisei 6-118300

[Patent Literature 6] Japanese Patent Unexamined Publication Showa 64-49014;

As an aberration that conventionally occurs in an imaging optical system, an aberration that warps an image (particularly an image that is off-axis), referred to as distortion, is known.

The distortion is an aberration that is proportional to the third power of the view angle. Therefore, the distortion is not a significant problem in an optical system with a narrow view angle. However, the distortion is an extremely significant problem in a wide-angle optical system.

For example, the single lens optical systems described in Patent Literatures 1 to 3 have a view angle (view angle of corresponding angles) of about 60°, which is a sufficiently wide view angle for a wide-angle optical system used in a solid image pickup device. The single lens optical systems also have superior resolutions. However, a large distortion occurs because of the wideness of the view angle.

The single lens optical systems described in Patent Literature 4 and 5 are optical systems proposed for use in various sensors or photometry. Therefore, the intended use of these single lens optical systems greatly differs from the optical system for the solid image pickup device.

The single lens optical system described in Patent Literature 6 is for narrow view angles (for example, the maximum view angle is about 35°) and is not suitable for wide-angle optical systems at all.

In this way, conventionally, the distortion could not be sufficiently corrected in the wide-angle optical system for solid image pickup devices.

Therefore, the present invention has been designed in view of the aforementioned problems. The object of the present invention is to provide a wide-angle optical system for a solid image pickup device that can effectively correct distortion.

SUMMARY OF THE INVENTION

In order to achieve the aforementioned object, the wide-angle optical system for a solid image pickup device according to a first aspect of the present invention is a wide-angle optical system for a solid image pickup device comprising an imaging lens and a diaphragm that is disposed on the object side of the imaging lens, wherein the imaging lens is a biconvex lens, an image side face of the imaging lens is formed into an aspheric shape in which the negative refracting power becomes stronger the farther the imaging lens is from the optical axis in the radial direction, and a condition expressed by the following expression (1) is to be satisfied;

$$0.8 > |r_1/r_2| \geq 0.5 \quad (1)$$

where,
- $r_1$: center radius curvature of the object side face of the imaging lens
- $r_2$: center radius curvature of the image surface side face of the imaging lens.

In the first aspect of the present invention, the absolute value of the ratio of the center radius curvature of the object side face of the imaging lens to the center radius curvature of the image surface side face of the imaging lens satisfies the expression (1). With this, it is possible to maintain telecentricity and secure back focus distance while effectively correcting distortion.

A wide-angle optical system for a solid image pickup device according to a second aspect is the wide-angle optical system for a solid image pickup device according to the first aspect, wherein, further, the imaging lens satisfies a condition expressed by a following expression (2);

$$0.8 > d/fl \geq 0.45 \quad (2)$$

where,
- d: center thickness of the imaging lens
- fl: focal distance of the imaging lens.

In the second aspect of the invention, the ratio of the center thickness of the imaging lens to the focal distance satisfies the expression (2). With this, it is possible to suppress the occurrence of field curvature and maintain a favorable image quality of the periphery in particular while effectively correcting the distortion.

A wide-angle optical system for a solid image pickup device according to a third aspect of the present invention is the wide-angle optical system for a solid image pickup device according to the second aspect, wherein, further, the imaging lens satisfies a condition expressed by a following expression (3);

$$1.5 \geq |r_2/fl| \geq 0.7 \quad (3).$$

In the third aspect of the invention, further, the absolute value of the ratio of the center radius curvature of the image surface side face of the imaging lens to the focal distance satisfies the expression (3). With this, it is possible to maintain telecentricity and secure back focus distance while effectively correcting distortion.

A wide-angle optical system for a solid image pickup device according to a fourth aspect is the wide-angle optical system for a solid image pickup device according to any one of aspects 1-3, wherein, further, a condition expressed by a following expression (4) is to be satisfied;

$$0.4 \geq |SH/ff| \geq 0 \quad (4)$$

where,

SH: distance from the front side principle point of the imaging lens to the diaphragm.

In the fourth aspect of the invention, further, the ratio of the distance from the front side principle point of the imaging lens to the diaphragm to the focal distance of the imaging lens satisfies the expression (4). With this, it is possible to suppress the size of the entire optical system while maintaining telecentricity.

With the wide-angle optical system for a solid image pickup device according to the first aspect of the present invention, it is possible to maintain telecentricity and secure back focus distance while effectively correcting distortion. In addition, a wide-angle optical system for a solid image pickup device that can significantly improve optical performance can be actualized.

Further, in addition to the effects of the wide-angle optical system for a solid image pickup device according to the first aspect, the wide-angle optical system for a solid image pickup device according to the second aspect can maintain a favorable image quality of the periphery. In addition, a wide-angle optical system for a solid image pickup device that has more excellent optical performance can be actualized.

Furthermore, in addition to the effects of the wide-angle optical system for a solid image pickup device according to the second aspect, the wide-angle optical system for a solid image pickup device according to the third aspect can further maintain telecentricity and secure back focus distance while effectively correcting distortion. In addition, a wide-angle optical system for a solid image pickup device that can further improve optical performance can be actualized.

Moreover, in addition to the effects of the wide-angle optical system for a solid image pickup device according to any one of the aspects 1 to 3, the wide-angle optical system for a solid image pickup device according to the fourth aspect can actualize a wide-angle optical system for a solid image pickup device that has more excellent optical performance suitable for reducing size and weight.

DETAILED DESCRIPTION OF THE PREFERRED EMBODIMENT

An embodiment of the wide-angle optical system for a solid image pickup device according to the present invention will be described hereinafter by referring to FIG. 1.

Figure 1:
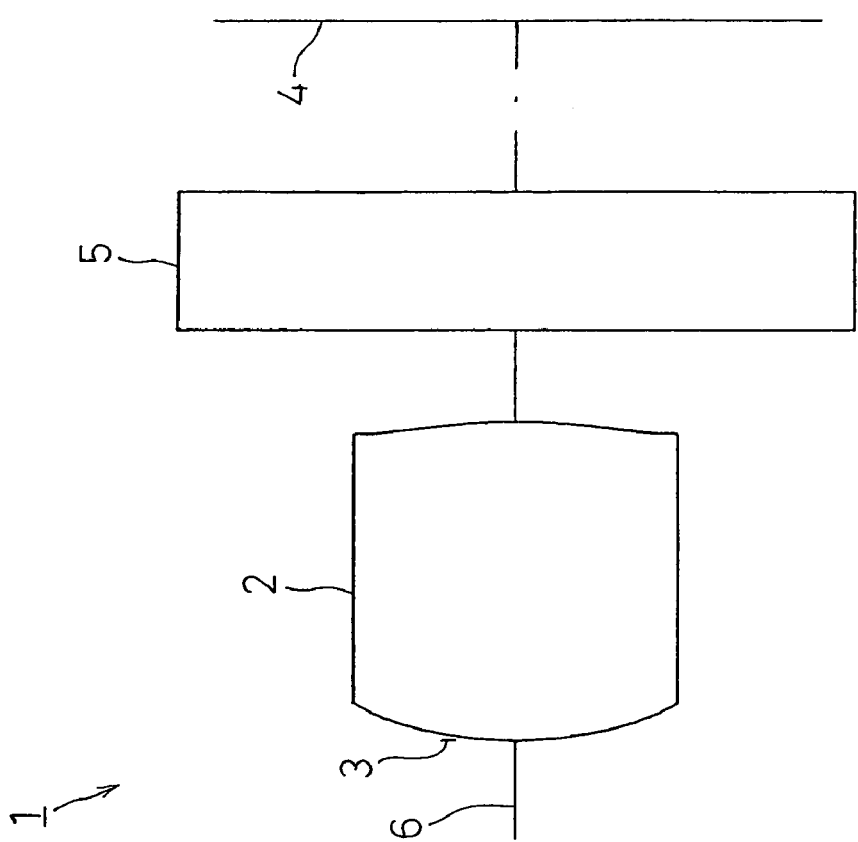
FIG. 1 is a schematic diagram for showing an embodiment of the wide-angle optical system for a solid image pickup device according to the present invention.

As shown in FIG. 1, a wide-angle optical system for a solid image pickup device 1 of the embodiment comprises an imaging lens formed from resin material or the like and a diaphragm 3 that is disposed on the object side of the imaging lens.

At the same time, on the image surface side of the imaging lens 2, there is disposed an image-taking surface 4 that is a light-receiving surface of a solid image pickup device such as CCD or CMOS.

In addition, between the imaging lens 2 and the imaging surface 4, there are disposed various filters 5, such as a cover glass, an IR cut filter, and a lowpass filter. The various filters 5 may be disposed as required.

Further, in the embodiment, the imaging lens 2 is a biconvex lens. At least the image surface side face (hereinafter referred to as a second face) of the imaging lens 2, which is the biconvex lens, is formed into an aspherical shape in which the negative refracting power becomes stronger the farther the imaging lens 2 is from an optical axis 6 in the radial direction.

Still further, in the embodiment, the imaging lens 2 is to satisfy the condition expressed by the following expression (1);

$$0.8 > |r_1/r_2| \geq 0.5 \quad (1)$$

where, $r_1$ in the expression (1) is the center radius curvature of the object side face of the imaging lens 2 (hereinafter referred to as a first surface) (the same is true hereinafter). $r_2$ is the center radius curvature of the second face of the imaging lens 2 (the same is true hereinafter). Further, $|r_1/r_2|$ is a ratio of the center radius curvature of the first face of the imaging lens 2 to the center radius curvature of the second face of the imaging lens 2.

When the value of $|r_1/r_2|$ is the value (0.8) shown in the expression (1) or more, the power of the second face of the imaging lens 2 becomes too strong. Therefore, the distortion cannot be effectively corrected. At the same time, when the value of $|r_1/r_2|$ is becomes below the value (0.5) shown in the expression (1), the distortion can be corrected. However, telecentricity cannot be adequately maintained, and the light ray (light beam) incident on the solid image pickup device (image-taking surface 4) has a large angle in relation to the optical axis 6. In addition, back focus distance that is the distance between the top face of the second face of the imaging lens 2 and the image-taking face 4 cannot be secured. As a result, structural problems are likely to occur, such as the various filters 5 not being able to be inserted between the image-taking surface 4 and the imaging lens 2.

Therefore, by further setting the value of $|r_1/r_2|$ to satisfy the expression (1) in the embodiment, telecentricity can be maintained and the necessary back focus distance can be secured while effectively correcting distortion.

It is more preferable for the value of $|r_1/r_2|$ to satisfy the expression $0.8 > |r_1/r_2| \geq 0.6$.

In addition, in the embodiment, the imaging lens 2 is to further satisfy the condition expressed by the following expression (2);

$$0.8 > d/fl \geq 0.45 \qquad (2)$$

where, d is the center thickness of the imaging lens 2 (the same, hereinafter) and fl is the focal distance of the imaging lens 2 (the same, hereinafter). Further, d/fl is the ratio of the center thickness of the imaging lens 2 to the focal distance of the imaging lens 2.

When the value of d/fl is the value (0.8) shown in the expression (2) or more, the size of the imaging lens 2 becomes large not only in the optical axis 6 (thickness) direction, but also in the radial direction perpendicular to the optical axis 6. Therefore, size reduction of the optical system becomes difficult. In addition, field curvature occurs. As a result, although a favorable image quality can be maintained in the center of the display image, it becomes harder to maintain the image quality as it gets closer to the periphery. At the same time, when the value of d/fl becomes below the value (0.45) shown in the expression (2), distortion cannot be effectively corrected.

Therefore, by further setting the value of d/fl to satisfy the expression (2) in the embodiment, the occurrence of field curvature can be suppressed and a favorable image quality can be maintained in the periphery in particular while effectively correcting distortion.

It is more preferable for the value of d/fl to satisfy the expression $0.8 > d/fl \geq 0.55$.

In addition, in the embodiment, the imaging lens 2 is to further satisfy the condition expressed by the following expression (3);

$$1.5 \geq |r_2/fl| \geq 0.7 \qquad (3)$$

where, $|r_2/fl|$ in the expression (3) is an absolute value of the ratio of the center radius curvature of the second face of the imaging lens 2 to the focal distance of the imaging lens 2.

When the value of $|r_2/fl|$ is larger than the value (1.5) shown in the expression (3), distortion can be corrected. However, telecentricity cannot be maintained, and the light ray (light beam) incident on the solid image pickup device (image-taking surface 4) has a large angle in relation to the optical axis 6. Furthermore, it becomes difficult to secure the necessary back focus distance. At the same time, when the value of $|r_2/fl|$ becomes below the value (0.7) shown in the expression (3), the power of the second face of the imaging lens 2 becomes too strong. As a result, distortion cannot be effectively corrected.

Therefore, by further setting the value of $|r_2/fl|$ to satisfy the expression (3) in the embodiment, telecentricity can be maintained and the necessary back focus distance can be secured while effectively correcting distortion.

It is more preferable for the value of $|r_2/fl|$ to satisfy the expression $1.3 \geq |r_2/fl| 0.8$.

In addition, in the embodiment, the imaging lens 2 is to further satisfy the condition expressed by the following expression (4);

$$0.4 \geq SH/fl \geq 0 \qquad (4)$$

where, SH in the expression (4) is the distance from the front side principle point of the imaging lens 2 to the diaphragm 3. SH/fl is the ratio of the distance from the front side principle point of the imaging lens 2 to the diaphragm 3 to the focal distance of the imaging lens 2.

When the value of SH/fl is larger than the value (0.4) shown in the expression (4), the entire optical system becomes too large, and size and weight reduction becomes difficult. At the same time, when the value of SH/fl becomes below the value (0) shown in the expression (4), telecentricity cannot be maintained.

Therefore, by further setting the value of SH/fl to satisfy the expression (4) in the embodiment, the size of the entire optical system can be suppressed while further appropriately maintaining telecentricity.

As a more preferable embodiment, the maximum view angle (view angle of corresponding angles) of the wide-angle optical system for a solid image pickup device is 60° or more.

In this case, the effect of image improvement caused by distortion correction becomes larger. Compared to the conventional wide-angle optical system for a solid image pickup device having a maximum view angle of 60° or more, the optical property can be significantly enhanced.

It is more preferable for the imaging lens 2 to satisfy the condition expressed by the following expression (5);

$$fl \leq 2.5 \text{ (mm)} \qquad (5).$$

When the value of fl is larger than the value (2.5 mm) shown in the expression (5), the center thickness of the imaging lens 2 becomes too thick and the moldability is reduced. In addition, the image quality of an image that is off-axis deteriorates because of the effects of aberrations, such as field curvature.

Therefore, by further setting the value of fl to satisfy the expression (5) in the embodiment, moldability can be improved and aberrations such as field curvature can be more favorably corrected to further improve the image quality.

EXAMPLES

Next, EXAMPLES of the present invention will be described by referring to FIG. 2 or FIG. 7.

In the EXAMPLES, F no denotes F number and r denotes a curvature radius of an optical surface (the center radius curvature in the case of the imaging lens 2). In addition, d denotes a distance to the next optical surface. Further, 2ω denotes a total view angle (view angle of corresponding angles). Still further, nd denotes the index of refraction of each optical system when to the d line (yellow) is irradiated, and vd denotes the Abbe number of each optical system when the d line is similarly irradiated.

k, A, B, C, and D denote each coefficient in a following expression (6). Specifically, the shape of the aspherical surface of the imaging lens 2 is expressed by the following expression provided that the direction of the optical axis 6 is taken as the Z axis, the direction orthogonal to the optical axis 6 as the X axis, the traveling direction of light is positive, k is the constant of cone, A, B, C, and D are the aspherical coefficients, and r is the center radius curvature $$Z(X) = r^{-1}X^2/[1+\{1-(k+1)r^{-2}X^2\}^{1/2}]+AX^4+BX^6+CX^8+DX^{10} \qquad (6).$$

In the following EXAMPLES, reference code E used for a numerical value denoting the constant of cone and the aspherical coefficient indicates that the numerical value following E is an exponent having 10 as the base and that the numerical value before E is multiplied by the numerical value denoted by the exponent having 10 as the base. For example, 7.50E−1 denotes 7.50×10⁻¹.

First Example

Figure 2:
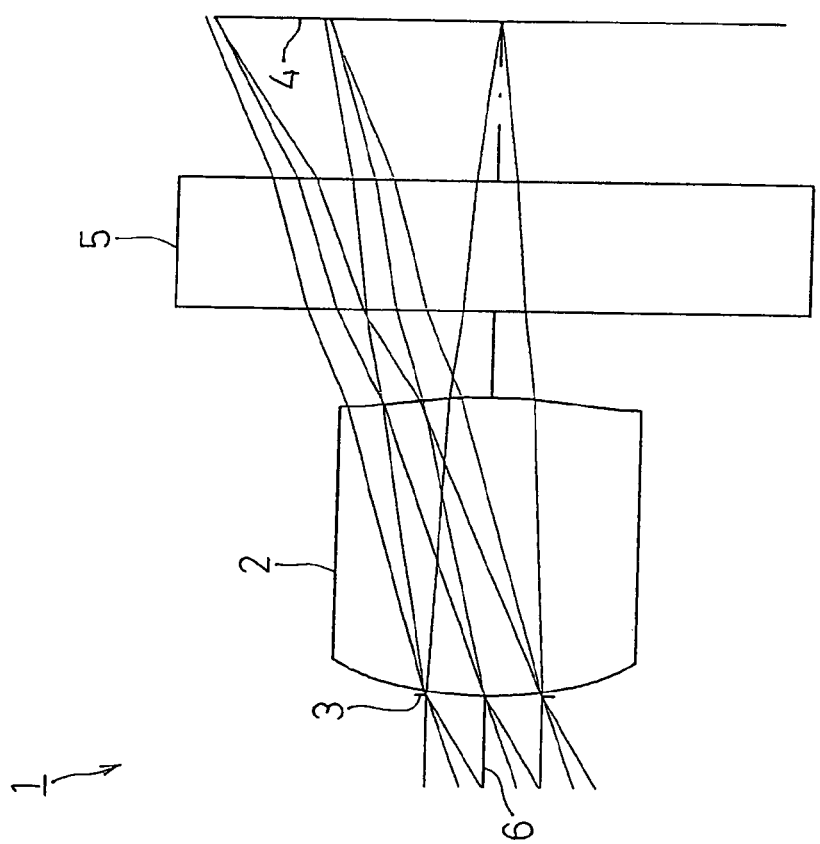
FIG. 2 is a schematic diagram for showing FIRST EXAMPLE of the wide-angle optical system for a solid image pickup device according to the present invention.

FIG. 2 shows a FIRST EXAMPLE of the present invention. In the FIRST EXAMPLE, like the wide-angle optical system for a solid image pickup device 1 with the structure of FIG. 1, the diaphragm 3 is disposed on the object side of the imaging lens 2 and a cover glass is disposed on the image surface side a the filter 5.

The wide-angle optical system for a solid image pickup device 1 of the FIRST EXAMPLE was set under the following condition.

Lens Data f=1.064 mm, F no=4.0, 2ω=65°

| Face Number (Object Point) | r | d | nd | vd |
|---|---|---|---|---|
| 1(Diaphragm) | 0.000 | 0.05 | | |
| 2(First Face of Imaging Lens) | 0.870 | 0.70 | 1.533 | 56.0 |
| 3(Second Face of Imaging Lens) | −1.176 | 0.20 | | |
| 4(First Face of Cover Glass) | 0.000 | 0.30 | 1.518 | 64.0 |
| 5(Second Face of Cover Glass) | 0.000 | | | |
| 6(Image Surface) | | | | |

| Face Number | k | A | B | C | D |
|---|---|---|---|---|---|
| 2 | 7.50E−1 | −1.09E−1 | −8.61 | 1.42E+2 | −2.41E+2 |
| 3 | −2.80E−1 | 1.60 | 1.00 | −1.50 | 2.00 |

Under such conditions, $|r_1/r_2|=0.74$ was achieved, thereby satisfying the expression (1). d/fl=0.66 was achieved, thereby satisfying the expression (2). $|r_1/fl|=1.11$ was achieved, thereby satisfying the expression (3). SH/fl=0.047 was achieved, thereby satisfying the expression (4). fl=1.064 mm was achieved, thereby satisfying the expression (5).

Figure 3:
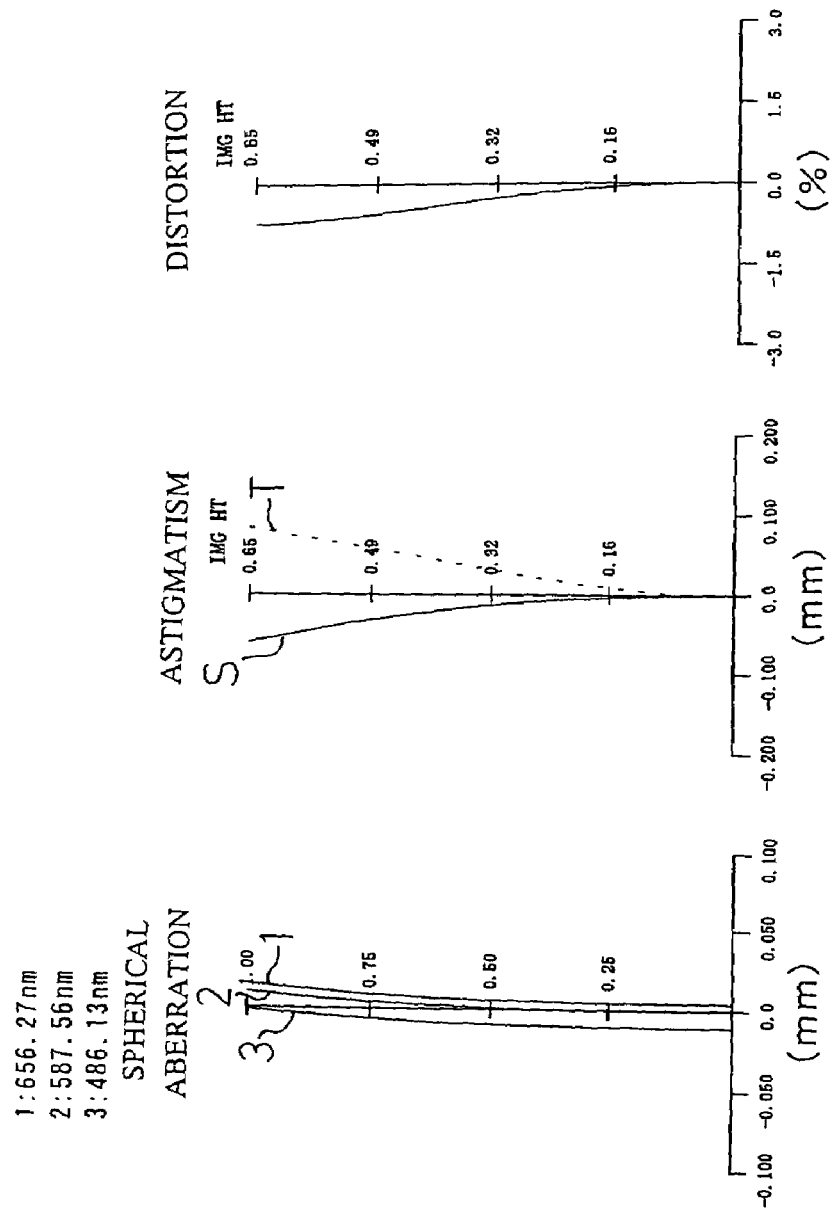
FIG. 3 shows graphs for describing the spherical aberration, astigmatism, and distortion of the wide-angle optical system for a solid image pickup device shown in FIG. 2.

FIG. 3 shows the spherical aberration, astigmatism, and distortion of the wide-angle optical system for a solid image pickup device 1 of the FIRST EXAMPLE.

According to the result, each of the spherical aberration, astigmatism, distortion, and lateral aberration was almost satisfied. It can be seen from the result that a sufficient optical property can be obtained.

Second Example

Figure 4:
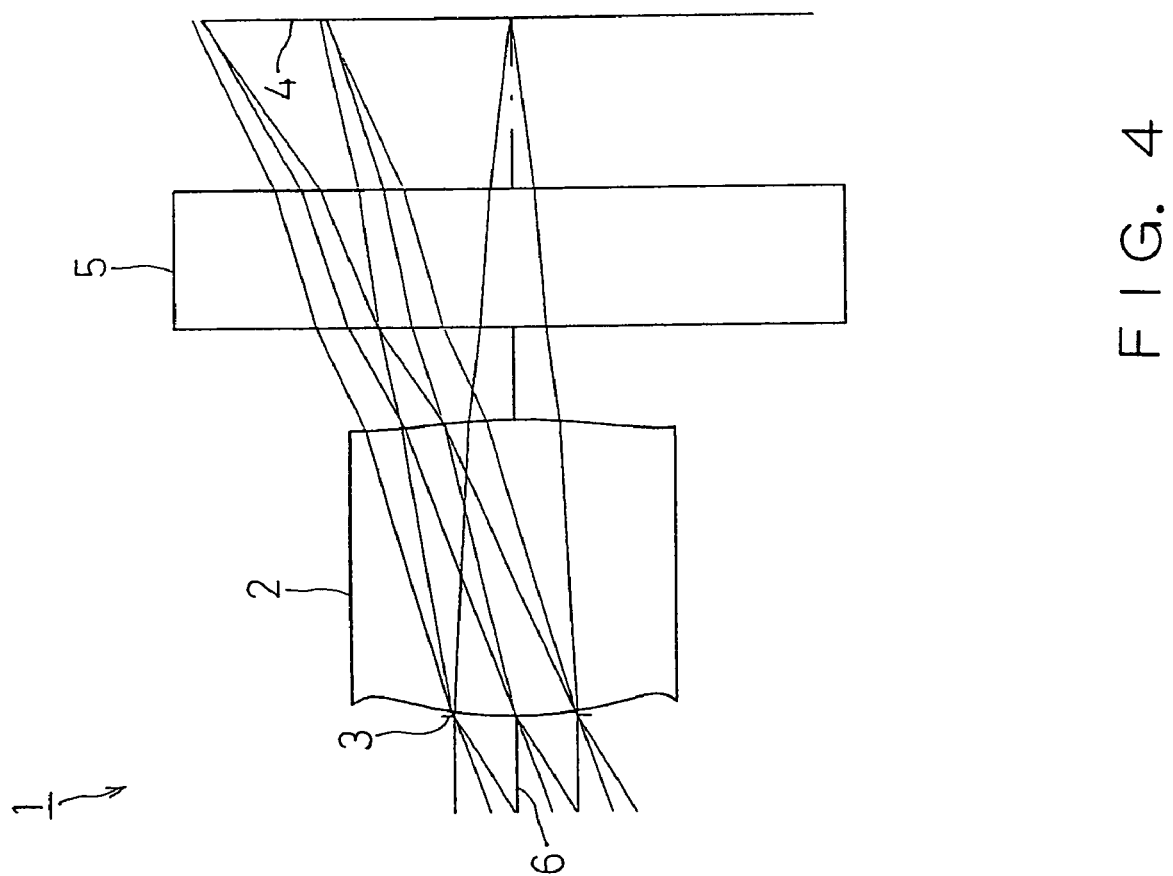
FIG. 4 is a schematic diagram for showing SECOND EXAMPLE of the wide-angle optical system for a solid image pickup device according to the present invention.

FIG. 4 shows a SECOND EXAMPLE of the present invention. In the SECOND EXAMPLE, like the wide-angle optical system for a solid image pickup device 1 with the structure of FIG. 1, the diaphragm 3 is disposed on the object side of the imaging lens 2 and a cover glass is disposed on the image surface side a the filter 5.

The wide-angle optical system for a solid image pickup device 1 of the SECOND EXAMPLE was set under the following condition.

Lens Data f=1.052 mm, F no=4.0, 2ω=65°

| Face Number (Object Point) | r | d | nd | vd |
|---|---|---|---|---|
| 1(Diaphragm) | 0.000 | 0.05 | | |
| 2(First Face of Imaging Lens) | 0.833 | 0.65 | 1.533 | 56.0 |
| 3(Second Face of Imaging Lens) | −1.250 | 0.20 | | |
| 4(First Face of Cover Glass) | 0.000 | 0.30 | 1.518 | 64.0 |
| 5(Second Face of Cover Glass) | 0.000 | | | |
| 6(Image Surface) | | | | |

| Face Number | k | A | B | C | D |
|---|---|---|---|---|---|
| 2 | 7.50E−1 | −1.09E−1 | −8.60 | 1.42E+2 | −2.41E+3 |
| 3 | −2.80E−1 | 1.85 | 1.00 | −1.50 | 2.00 |

Under such conditions, $|r_1/r_2|=0.67$ was achieved, thereby satisfying the expression (1). d/fl=0.62 was achieved, thereby satisfying the expression (2). $|r_1/fl|=1.19$ was achieved, thereby satisfying the expression (3). SH/fl=0.048 was achieved, thereby satisfying the expression (4). fl=1.052 mm was achieved, thereby satisfying the expression (5).

Figure 5:
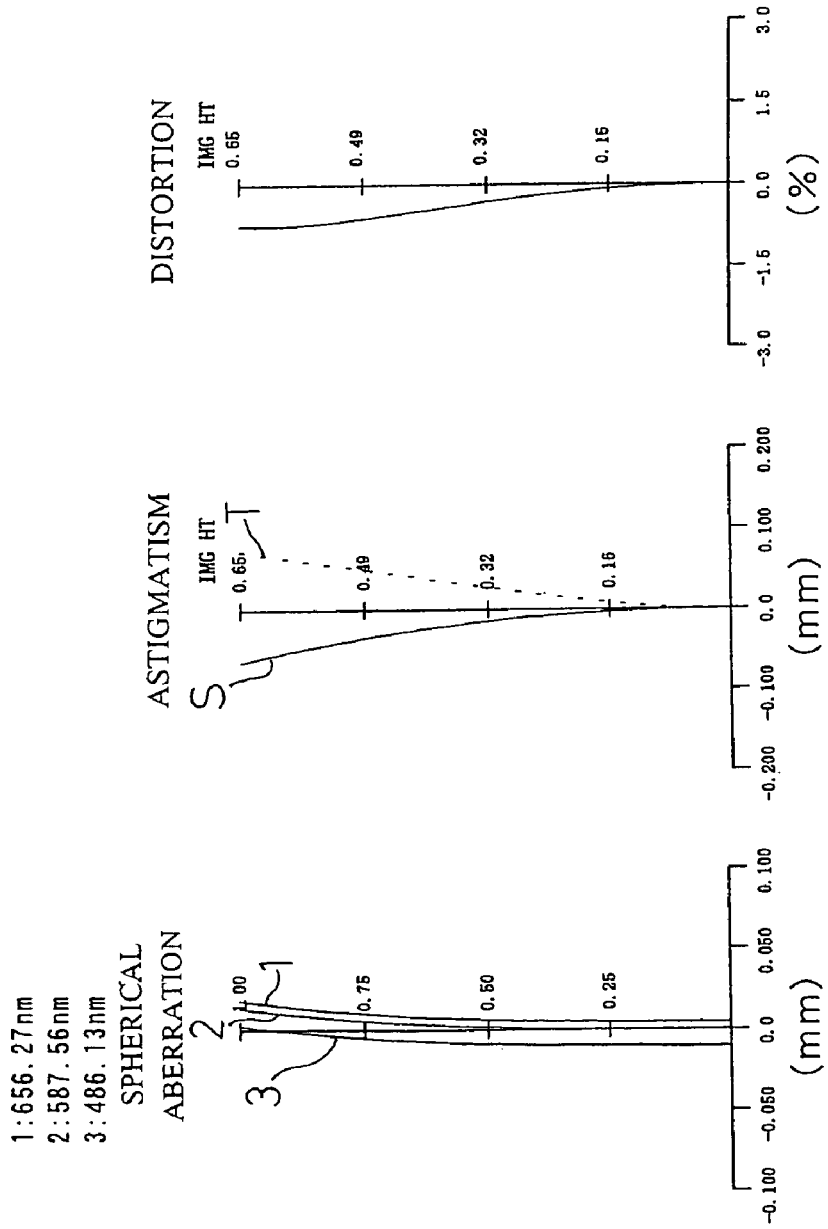
FIG. 5 shows graphs for describing the spherical aberration, astigmatism, and distortion of the wide-angle optical system for a solid image pickup device shown in FIG. 4.

FIG. 5 shows the spherical aberration, astigmatism, and distortion of the wide-angle optical system for a solid image pickup device 1 of the SECOND EXAMPLE.

According to the result, each of the spherical aberration, astigmatism, distortion, and lateral aberration was almost satisfied. It can be seen from the result that a sufficient optical property can be obtained.

Third Example

Figure 6:
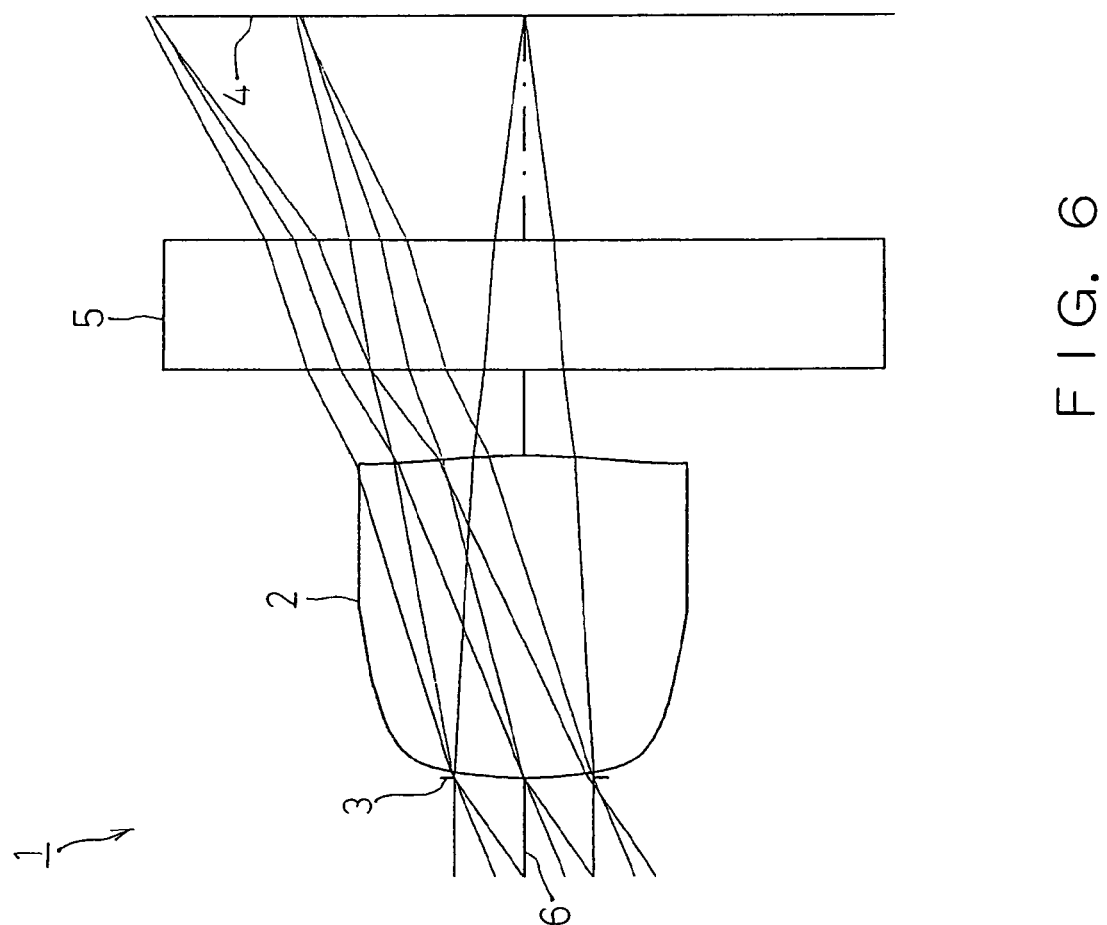
FIG. 6 is a schematic diagram for showing THIRD EXAMPLE of the wide-angle optical system for a solid image pickup device according to the present invention.

FIG. 6 shows a THIRD EXAMPLE of the present invention. In the THIRD EXAMPLE, like the wide-angle optical system for a solid image pickup device 1 with the structure of FIG. 1, the diaphragm 3 is disposed on the object side of the imaging lens 2 and a cover glass is disposed on the image surface side a the filter 5.

The wide-angle optical system for a solid image pickup device 1 of the THIRD EXAMPLE was set under the following condition.

Lens Data f=1.262 mm, F no=4.0, 2ω=83°

| Face Number (Object Point) | r | d | nd | vd |
|---|---|---|---|---|
| 1(Diaphragm) | 0.000 | 0.05 | | |
| 2(First Face of Imaging Lens) | 0.952 | 0.75 | 1.533 | 56.0 |
| 3(Second Face of Imaging Lens) | −1.667 | 0.20 | | |
| 4(First Face of Cover Glass) | 0.000 | 0.30 | 1.518 | 64.0 |
| 5(Second Face of Cover Glass) | 0.000 | | | |
| 6(Image Surface) | | | | |

| Face Number | k | A | B | C | D |
|---|---|---|---|---|---|
| 2 | −3.21 | −6.69E−1 | −8.30E−1 | 9.15E+2 | −2.90E+2 |
| 3 | −2.80E−1 | 1.20 | 3.08E−1 | −2.89E−1 | 2.41E−1 |

Under such conditions, $|r_1/r_2|=0.57$ was achieved, thereby satisfying the expression (1). d/fl=0.59 was achieved, thereby satisfying the expression (2). $|r_1 fl|=1.32$ was achieved, thereby satisfying the expression (3). SH/fl=0.04 was achieved, thereby satisfying the expression (4). fl=1.262 mm was achieved, thereby satisfying the expression (5).

Figure 7:
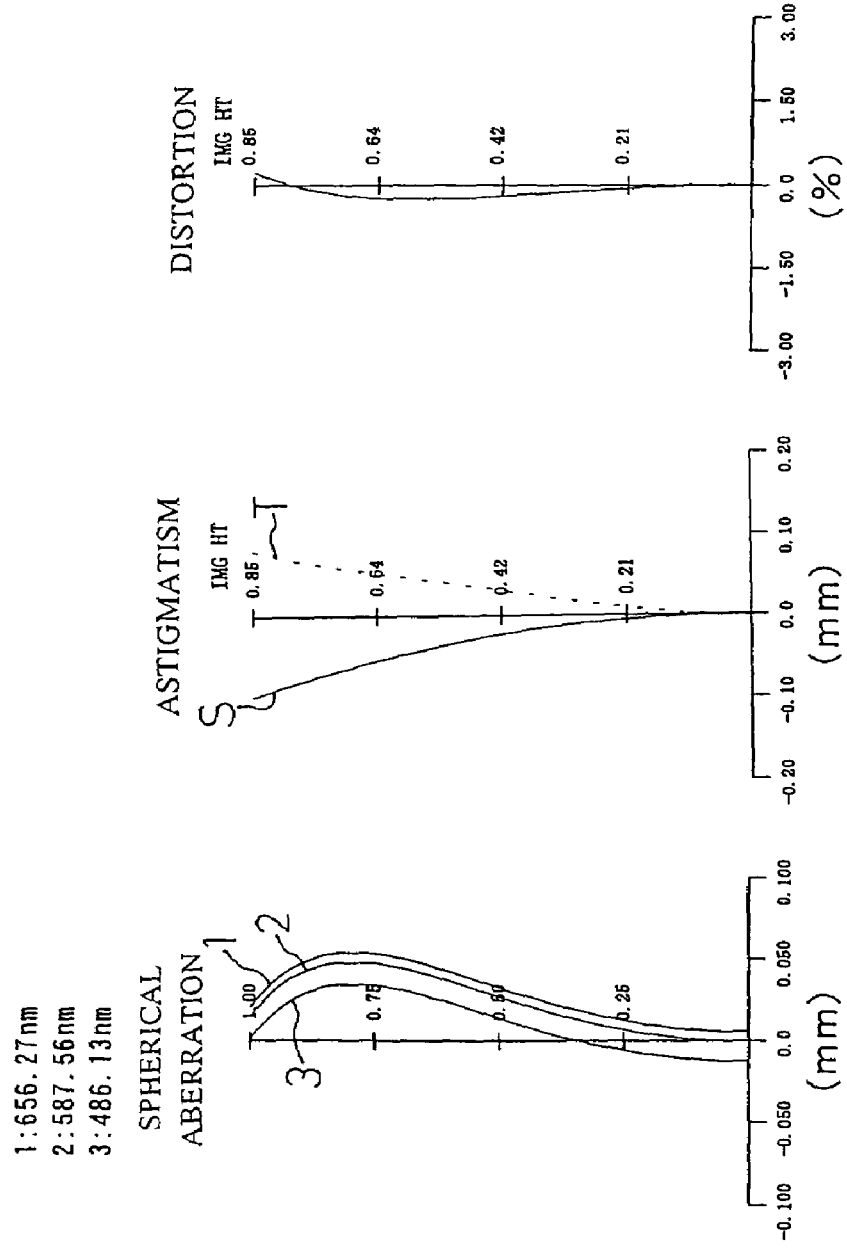
FIG. 7 shows graphs for describing the spherical aberration, astigmatism, and distortion of the wide-angle optical system for a solid image pickup device shown in FIG. 6.

FIG. 7 shows the spherical aberration, astigmatism, and distortion of the wide-angle optical system for a solid image pickup device 1 of the THIRD EXAMPLE.

According to the result, each of the spherical aberration, astigmatism, distortion, and lateral aberration was almost satisfied. It can be seen from the result that a sufficient optical property can be obtained.

The present invention is not limited to the above- described embodiments and EXAMPLES, and various modifications are possible as required.

What is claimed is:

1. A wide-angle optical system for a solid image pickup device comprising an imaging lens and a diaphragm that is disposed on an object side of said imaging lens, wherein:

said imaging lens is a biconvex lens, an image side face thereof is formed into an aspheric shape in which a negative refracting power becomes stronger the farther said imaging lens is from an optical axis in a radial direction, and a condition expressed by the following expression (1) is to be satisfied;

$$0.8 > |r_1/r_2| \geqq 0.5 \tag{1}$$

where, $r_1$: center radius curvature of said object side face of said imaging lens $r_2$: center radius curvature of an image surface side face of said imaging lens.

2. The wide-angle optical system for a solid image pickup device according to claim 1, wherein, further, a condition expressed by a following expression (2) is to be satisfied;

$$0.8 > d/fl \geqq 0.45 \tag{2}$$

where, d: center thickness of said imaging lens fl: focal distance of said imaging lens.

3. The wide-angle optical system for a solid image pickup device according to claim 2, wherein, further, a condition expressed by a following expression (3) is to be satisfied;

$$1.5 \geqq |r_2/fl| \geqq 0.7 \tag{3}.$$

4. The wide-angle optical system for a solid image pickup device according to any one of claims 1 to 3, wherein, further, a condition expressed by a following expression (4) is to be satisfied;

$$0.4 \geqq SH/fl \geqq 0 \tag{4}$$

where

SH: distance from front side principle point of said imaging lens to said diaphragm.

* * * * *